United States Patent
Kakeya

(10) Patent No.: US 6,788,274 B2
(45) Date of Patent: Sep. 7, 2004

(54) APPARATUS AND METHOD FOR DISPLAYING STEREOSCOPIC IMAGES

(75) Inventor: Hideki Kakeya, Tokyo (JP)

(73) Assignee: National Institute of Information and Communications Technology, Koganei (JP)

(*) Notice: Subject to any disclaimer, the term of this patent is extended or adjusted under 35 U.S.C. 154(b) by 272 days.

(21) Appl. No.: 09/772,965

(22) Filed: Jan. 31, 2001

(65) Prior Publication Data
US 2001/0010508 A1 Aug. 2, 2001

(30) Foreign Application Priority Data
Jan. 31, 2000 (JP) .......................................... 2000-023204
Apr. 9, 2000 (JP) .......................................... 2000-266656

(51) Int. Cl.⁷ ............................................... G09G 5/00
(52) U.S. Cl. .............................. 345/7; 345/32; 349/15; 359/462; 348/51
(58) Field of Search ...................... 345/7, 32; 349/15; 359/462–477; 348/51–60; 353/7–8

(56) References Cited

U.S. PATENT DOCUMENTS

| | | | | |
|---|---|---|---|---|
| 4,562,463 A | * | 12/1985 | Lipton ........................... | 348/56 |
| 5,801,760 A | * | 9/1998 | Uomori ......................... | 348/47 |
| 5,855,425 A | * | 1/1999 | Hamagishi ..................... | 353/7 |
| 5,872,590 A | * | 2/1999 | Aritake et al. ................ | 348/57 |
| 6,040,852 A | * | 3/2000 | Stuettler ....................... | 348/43 |
| 6,252,707 B1 | * | 6/2001 | Kleinberger et al. ........ | 359/465 |
| 2002/0030887 A1 | * | 3/2002 | Hamagishi et al. ......... | 359/463 |
| 2002/0030888 A1 | * | 3/2002 | Kleinberger et al. ........ | 359/465 |

FOREIGN PATENT DOCUMENTS

JP          8-307907          11/1996

* cited by examiner

Primary Examiner—Bipin Shalwala
Assistant Examiner—Ricardo Osorio
(74) Attorney, Agent, or Firm—Oblon, Spivak, McClelland, Maier & Neustadt, P.C.

(57) ABSTRACT

A stereoscopic image display apparatus includes at least one display apparatus that displays parallactic first and second images; an image-separation apparatus that separates the first and second images from the display apparatus; an image formation system that form the separated first and second images on the respective eyes of a person viewing the stereoscopic images; and a position detection means able to acquire information on the positions of the viewer's eyeballs. The image-separation apparatus is provided between the display apparatus and the image formation system on a light path on which light information emitted by the display apparatus reaches the viewer. The image formation system is positioned between the image-separation apparatus and the viewer, and real images are formed between the image formation system and the viewer. Also, display contents of the first and second images are changed based on the positions of the viewer's eyeballs.

10 Claims, 8 Drawing Sheets

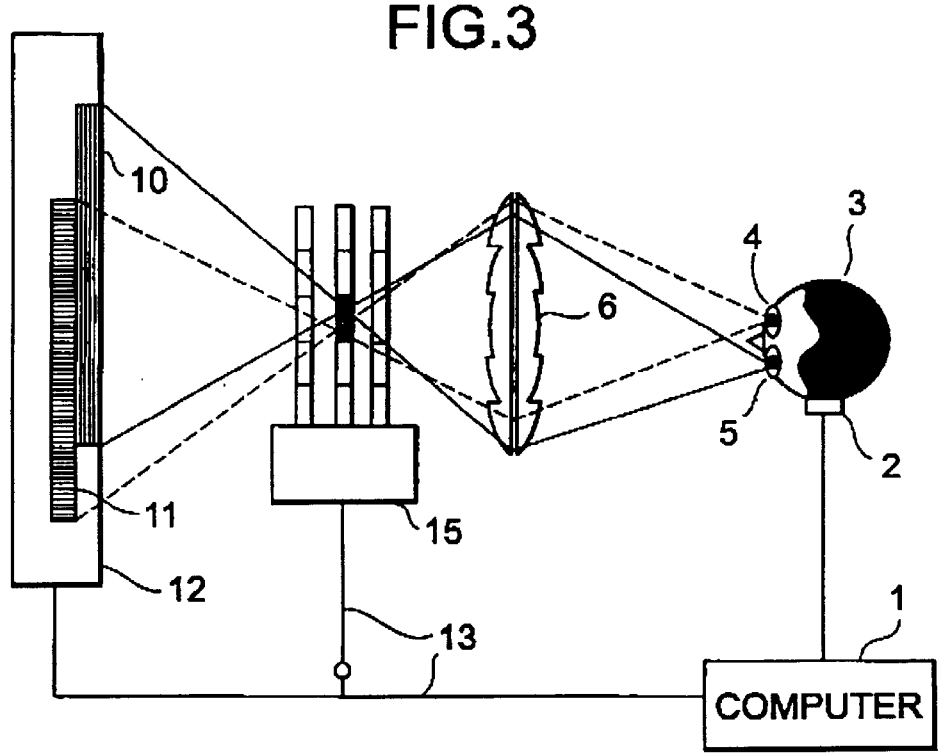
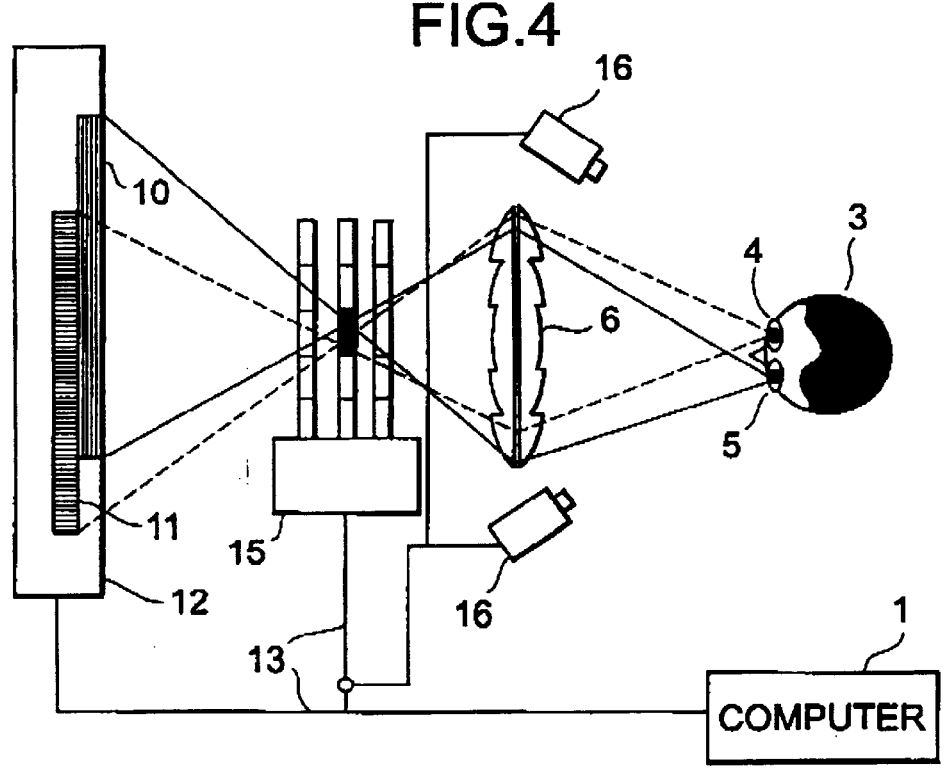

FIG.11(a) FIG.11(b)
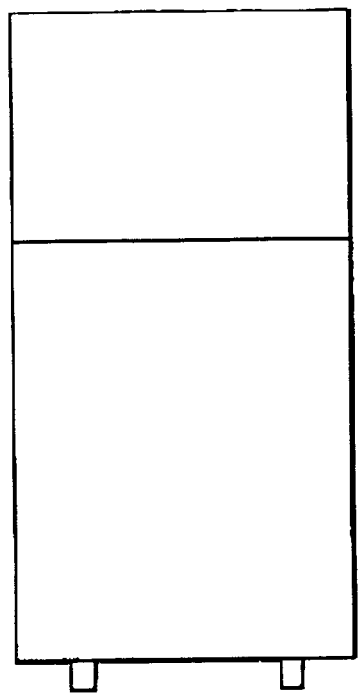
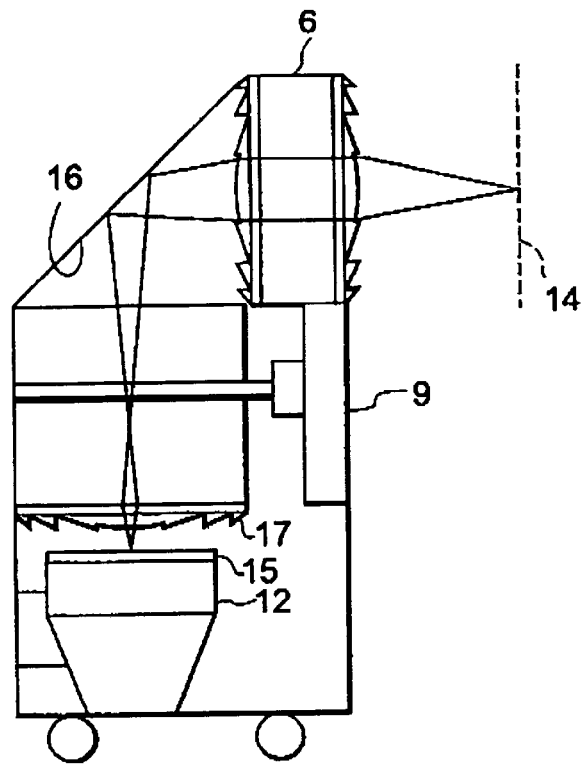
FIG.12
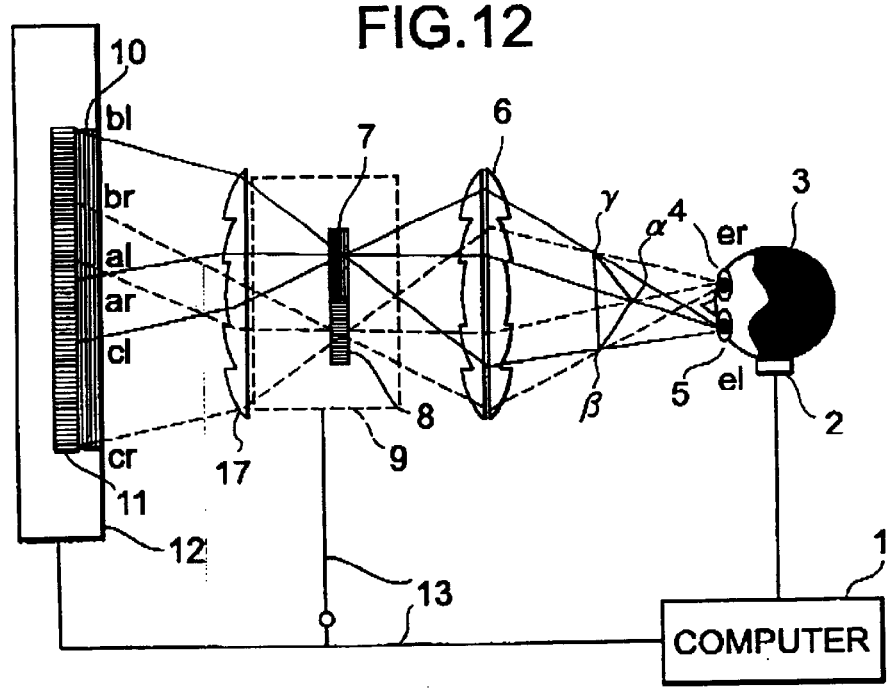

APPARATUS AND METHOD FOR DISPLAYING STEREOSCOPIC IMAGES

BACKGROUND OF THE INVENTION

1. Field of the Invention

The present invention relates to an apparatus and method for displaying stereoscopic images without having to wear stereoscopic spectacles.

2. Description of the Prior Art

FIG. 13 is a schematic view depicting a prior art display of stereoscopic images using stereoscopic glasses 30. The apparatus works by alternating, at high frequency, the display of images for the left eye 5 and images for the right eye 4. Moreover, a polarizing filter 33 having a high-speed liquid-crystal shutter that is in contact with a display screen 34 is used to give the displayed images mutually orthogonal polarization planes. By wearing the stereoscopic glasses 30, which are selectively polarizing, the left and right eyes 5 and 4 of a viewer 3 viewing the images can see these images independently. By means of these properties, stereoscopic pictures can be displayed by exhibiting parallactic images. When distant scenery is displayed using this picture display apparatus 35, the focal point of the eyes of the viewer 3 is on the display screen. Also when close scenery is displayed, the focal point of the eyes of the viewer 3 is on the display screen, giving rise to a discrepancy between the viewer's parallax and the focal point. The arrow 31 in FIG. 13 indicates the distance corresponding to the parallax at the point within a display area 36 at which the displayed image is at its closest, and. arrow 32 shows the difference between the image position corresponding to the parallax and the position corresponding to the focal point of the eyes. The magnitude of this difference is the discrepancy that arises between the parallax and focal point of the viewer 3.

Stereoscopic displays that do not require the wearing of stereoscopic glasses include the type which reproduce light produced by an object, and the type comprising an arrangement that presents respective images to each eye. The former includes holograms and volume displays. A problem with these is that they need a mechanism for processing large amounts of image data and complex devices for displaying the data. Such requirements pose difficulties when it comes to applications involving real-time display of high-resolution images and moving pictures. On the other hand, the latter type includes methods involving the use of lenticular lenses, image separators, and selective-emission backlighting and the like.

In the case of stereoscopic displays that show binocular parallactic images, with respect to an arbitrary viewpoint, interaction with the stereoscopic images requires coincidence between the coordinate systems of the visual information and the coordinate systems of the physical information. This is achieved by measuring the positions of the viewer's eyes in three dimensions and displaying the images matched to the viewpoints. However, as in the case of using the apparatus of FIG. 13, with this method, there is a problem in that, since the focal point of the viewer's eyes is on the display surface, it is difficult to get the stereoscopic image to jump out very far from the display apparatus. The reason for this is physiological: with respect to the perception of an object near to the eye, focal point information is given the same importance as parallax. Because of this, if an image with too much parallax is used in an effort to display an image in front of a viewer, the viewer becomes unable to perceive it as a stereoscopic image owing to excessive visual fatigue or dizziness. Furthermore, in applications in which the viewer uses part of his body in an interactive task, because it is necessary to present the stereoscopic image at a close distance and it is also necessary for the display apparatus to be arranged so that it does not physically obstruct movements of the viewer, the problem cannot be resolved by bringing the display apparatus closer. Thus, it has not been possible to fully use prior art stereoscopic displays utilizing binocular parallax for such applications.

In the stereoscopic image display apparatus of the present invention, an image-separation apparatus and image-formation system are disposed between the display apparatus and the viewer. The disclosure of JP-A-HEI 8-307907 is an example of a prior art arrangement of a projection type stereoscopic image display apparatus having a configuration similar to that of the present invention. The apparatus of the disclosure comprises image display means whereby image light for the left and right eyes having mutually different angles of polarization is projected onto a diffuser panel to display on the diffuser panel images for each eye; light path selection means for selecting light paths whereby image light based on the images for the left eye and image light based on the images for the right eye displayed by the image display means are transmitted by respective areas so as not to be superposed on a two-dimensional plane; polarization angle displacement means that imparts the same polarization angle to the image light for the left and right eyes either before or after the light has been transmitted by the areas; a light converging system for focusing on left and right eye positions the light having the same polarization angle thus transmitted by the respective areas; side-of-face detection means for detecting the left and right eye positions; and transmission area control means that, based on the side-of-face detection result, controls the areas that transmit the image light for the right and left eyes. The object of the projection type stereoscopic image display apparatus is just to present images to both eyes without using stereoscopic glasses. Although it has an apparatus for identifying the sides of the face for the purpose of dividing the light, it does not have a system for three-dimensional measurement of the positions of the two eyes.

Because it does not have an arrangement for changing images according to the position of the viewpoint and cannot therefore accurately ascertain the three-dimensional position of a stereoscopic image, the above apparatus cannot be used for interactions between the viewer and the stereoscopic image. In addition, the apparatus uses an optical system whereby the real image display plane is generated between the viewer and the lenses, giving rise to problems such as that the real image plane is distorted depending on the three-dimensional position of the observation point and that the three-dimensional position of the eyes cannot be identified. These are problems that cannot be resolved. Thus, in addition to the usual sense of discomfort caused by three-dimensional displays that do not refresh the images in accordance with the position of the viewpoint, there is also the discomfort produced by the distortion of the real image plane distorting the screen being viewed.

In the present invention, real images are formed between the viewer and the coupling system or converging system, and the images shown on the display apparatus are corrected by information on the position of the viewer's eyes. This is where the present invention differs from that of the above disclosure. The problem with prior art stereoscopic display methods and apparatuses that do not require the wearing of stereoscopic glasses is that the type which reproduces light produced by an object needs a mechanism for processing large amounts of image data and complex devices for displaying the data, while with the type that presents respective images to each eye, it is difficult to impart a perception of the stereoscopic image coming out in closeup from the screen.

In view of the above problems, an object of the present invention is to provide an apparatus and method for displaying a stereoscopic image in front of a viewer that appears to have depth, without the viewer wearing stereoscopic glasses.

Another object of the invention is to provide a small, light apparatus for displaying stereoscopic images that can be readily moved.

A further object of the invention is to provide an apparatus and method for displaying a stereoscopic image that expands the extent within which the viewer can move while still viewing the stereoscopic image.

SUMMARY OF THE INVENTION

In accordance with the present invention, the above objects are attained by a stereoscopic image display apparatus comprising at least one display apparatus that displays first and second images having parallax; an image-separation apparatus that separates the first and second images from the display apparatus; an image formation system that forms the first and second images thus separated on respective eyes; and a position detection means able to acquire information on positions of eyeballs of a viewer; wherein the image-separation apparatus is arranged between the display apparatus and the image formation system on a light path on which light information emitted by the display apparatus reaches the viewer, the image formation system is positioned between the image-separation apparatus and the viewer, real images of the display apparatus are formed between the image formation system and the viewer, and display content of the first image and display content of the second image are changed in accordance with the information on the positions of the viewer's eyeballs.

The present invention also comprises the above stereoscopic image display apparatus in which the at least one display apparatus has a configuration comprising a first projector for displaying an image having first characteristics and a second projector for displaying an image having second characteristics that differ from those of the first image.

The present invention also comprises the above stereoscopic image display apparatus in which the at least one display apparatus is a display apparatus that alternately displays first images at a first display frequency and second images at a second display frequency that is substantially the same as the first display frequency.

The present invention also provides a stereoscopic image display apparatus that in addition to the above configuration has a configuration in which the image-separation apparatus selects a light path in conjunction with viewer eyeball movement.

The present invention also provides a stereoscopic image display apparatus that in addition to the above configuration has a configuration that includes a plurality of display apparatuses and a plurality of real image planes formed by real images of the display apparatuses formed between the image formation system and the viewer; means for selecting one or a combination of display apparatuses from among the plurality of display apparatuses in accordance with image perspective information; and means for displaying images on the selected one or combination of the display apparatuses.

The present invention also comprises a stereoscopic image display apparatus having a light converging system between the at least one display apparatus and the image-separation apparatus.

The above objects are also attained by a stereoscopic image display method comprising steps of displaying on a display apparatus a first or second image corrected according to positional coordinates of a viewer's right or left eye, transmitting light signals emitted by the display apparatus through an image-separation apparatus that separates the first and second images, guiding the transmitted light signals to an image formation system, forming real images of the display apparatus between the image formation apparatus and the viewer, and presenting the formed images to the viewer.

The above objects are also attained by a stereoscopic image display method that in addition to the above steps, includes a step of modifying images on the display apparatus in accordance with movement in a viewer eye position, wherein, in an image creation method, with respect to all pixels xeX included in a set X of pixels of a three-dimensional image to be displayed, images presented to a viewer's right eye are drawn at points at which light paths that include line segments x-$e_r$ connecting x and a three-dimensional position $e_r$ of the right eye intersect a display plane of the display apparatus, and images presented to a viewer's left eye are drawn at points at which light paths that includes line segments x-$e_l$ connecting x and a three-dimensional position $e_l$ of the left eye intersect the display plane of the display apparatus.

The stereoscopic image display method of the present invention also includes a step of transmitting light signals produced by the display apparatus through the image-separation apparatus via a light converging system.

As described in the foregoing, a stereoscopic image can be displayed that appears to a viewer to be a solid image in front of the viewer by utilizing information on the positions of the viewer's eyes. Moreover, even if the viewer moves, since the light path used is selected in conjunction with the movements of the viewer's eyeball position, the viewer can continue to see the stereoscopic image. Furthermore, since the light converging system is positioned between the display apparatus and the image-separation apparatus, the apparatus can be made small and light.

The above and other objects, further features of the invention, its nature and various advantages will be more apparent from the accompanying drawings and following detailed description of the invention.

BRIEF DESCRIPTION OF THE DRAWINGS

FIG. 3 is a schematic view showing the configuration of a stereoscopic image display apparatus according to a second embodiment of the invention.

FIG. 4 is a schematic view showing the configuration of a stereoscopic image display apparatus according to a third embodiment of the invention.

FIG. 11(a) is a front view showing one example of the apparatus of FIG. 10, and FIG. 11(b) is a cross-sectional view of the apparatus shown in FIG. 11(a).

FIG. 12 is a schematic view for explaining the formation of an image using calculations based on the position of the eyes, in the apparatus of FIG. 1.

DESCRIPTION OF THE PREFERRED EMBODIMENT

Figure 2:
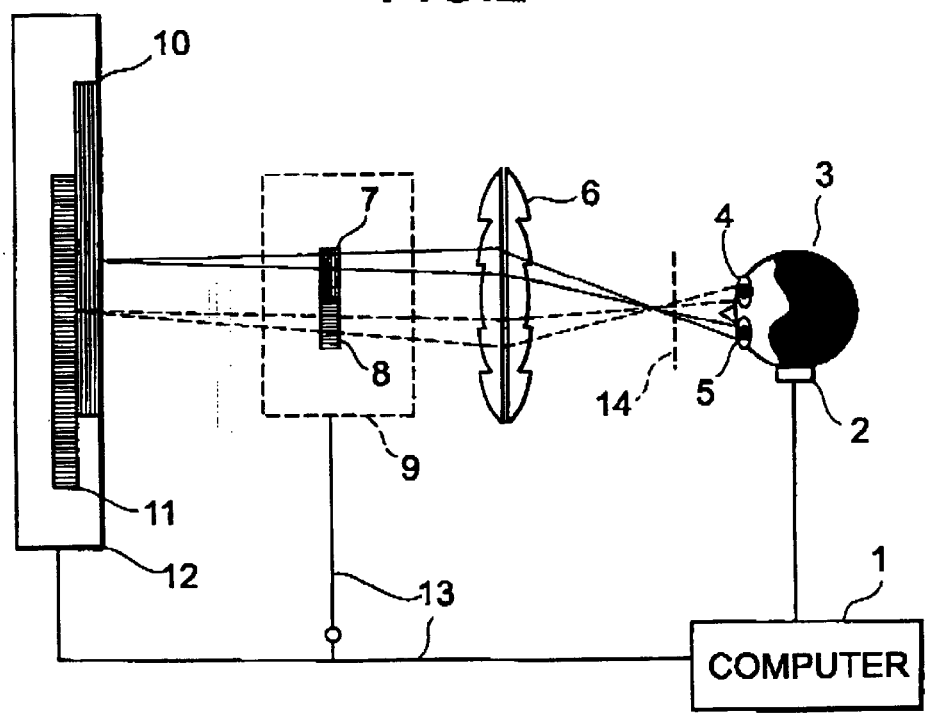
FIG. 2 is a schematic view showing a real image formed between a lens and a viewer in the apparatus of FIG. 1.

The gist of the present invention will now be explained with reference to FIG. 2. In accordance with this invention, FIG. 2 shows a configuration comprising a display apparatus 12 that displays, in front of a viewer 3, two types of parallactic images 10 and 11; apparatuses 7 and 8 that selectively transmit and separate the two types of images; an image-forming optical apparatus 6 that forms the separated images 10 and 11 on the respective eyes; and an apparatus 2 that detects the positions of the left eye 5 and right eye 4 of the viewer 3. The images displayed by the display apparatus 12 are changed in accordance with movement of the viewer's left and right eyes, and the selectively transmitting image-separation apparatuses 7 and 8 are controlled, presenting the viewer's left and right eyes with different images that include parallax. Along with this, by utilizing the image formation system to form real images on a real image plane 14 near the viewer, the viewer is presented with stereoscopic images that have depth.

As the apparatus 2 for detecting the positions of the viewer's left and right eyes 5 and 4, there is known a magnetic sensor that detects a magnetic incline 100 (FIG. 1) generated by a magnetism generator (not shown), calculates the position of the head and uses that as a basis for estimating the positions of the right and left eyes 4 and 5. An image-separation apparatus moving mechanism 9 is controlled so that the image-separation apparatus (filter) 7 that transmits only first images 10 is located at a point at which light incident on the left eye 5 position is gathered, and the image-separation apparatus (filter) 8 that transmits only second images 11 is located at a point at which light incident on the right eye 4 position is gathered.

Details of inventive embodiments are described below with reference to the accompanying drawings. In these drawings, elements and functions that are substantially the same are given the same reference symbols.

Figure 1:
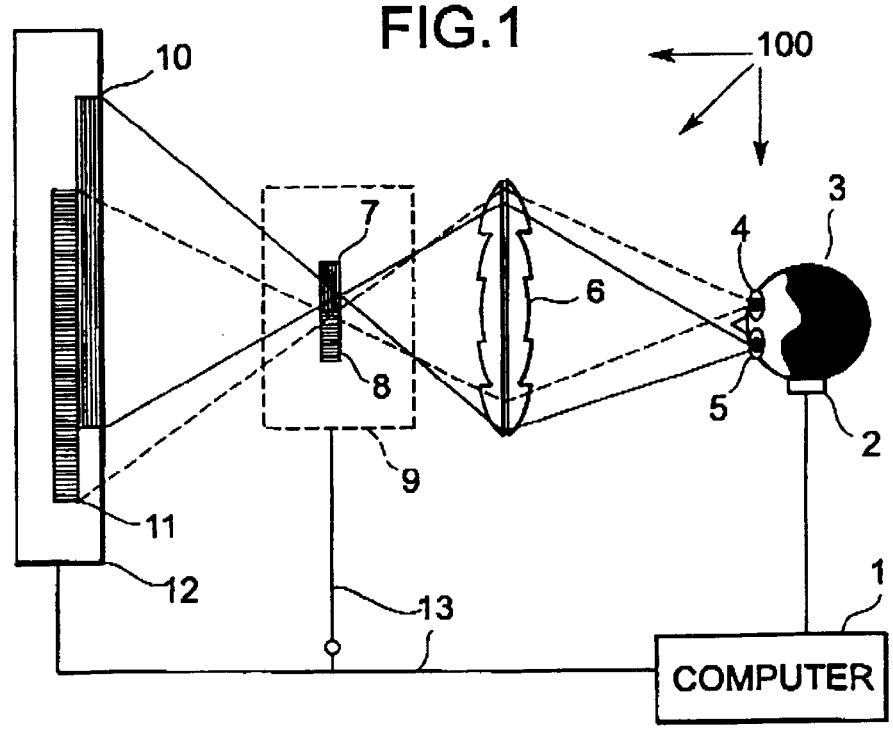
FIG. 1 is a schematic view showing the configuration of a stereoscopic image display apparatus according to a first embodiment of the present invention.
Figure 9:
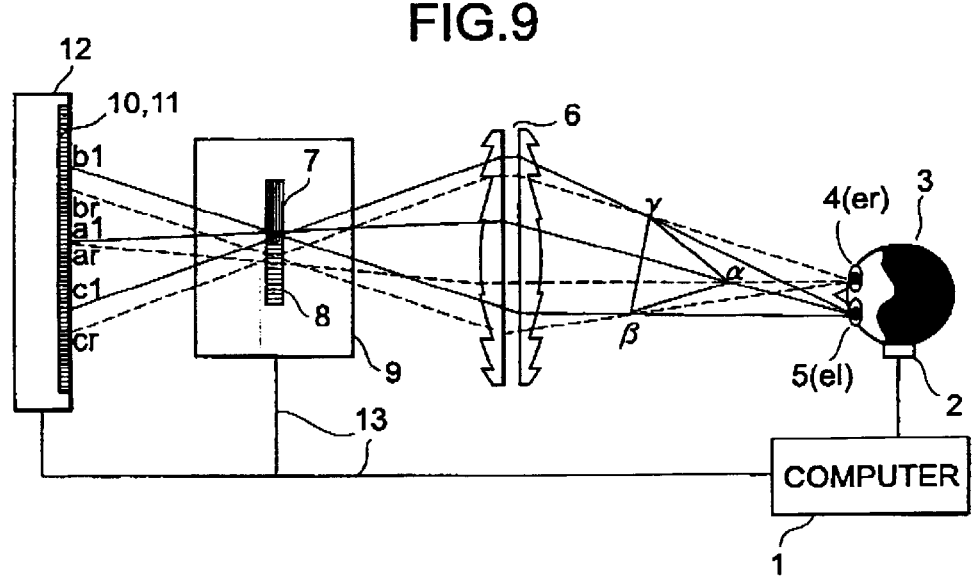
FIG. 9 is a schematic view for explaining a method for correcting the position and size of an image displayed on a plane at a position corresponding to the viewpoint of the viewer.

To start with, a first embodiment of the stereoscopic image display apparatus of the present invention will be described with reference to FIG. 1, which shows a display apparatus 12 that displays the first and second images 10 and 11. The images shown in FIG. 1 are images obtained when the position of each eye in three-dimensional space is observed, based on the information on the positions of the eyes of the viewer 3, the images being generated by computation to be displayed on the real image plane. To explain this computation with reference to FIG. 9: any pixel x∈X included in a set X of pixels of a three-dimensional image to be presented to the right eye 4 on the display apparatus 12 is drawn at a brightness value corresponding to a pixel x at a point at which a light path that includes a line segment x-$e_r$ connecting x and a three-dimensional position $e_r$ of the right eye intersects the display plane of the display apparatus 12. Similarly, any pixel x∈X included in a set X of pixels of a three-dimensional image to be presented to the left eye 5 on the display apparatus 12 is drawn at a brightness value corresponding to a pixel x at a point at which a light path that includes a line segment x-$e_l$ connecting x and a three-dimensional position $e_l$ of the left eye intersects the display plane of the display apparatus 12.

The light path can be calculated by a well-known method using trigonometric functions based on lens curvature and refractive index. For example, when three points α, β and γ are to be drawn in a three-dimensional space, as in FIG. 9, images for the right eye are drawn at brightness values corresponding to the points α, β, γ at points $a_r$, $b_r$, $c_r$ at which light paths that include line segments α-$e_r$, β-$e_r$, γ-$e_r$ intersect the display plane of the display apparatus 12, and images for the left eye are drawn at brightness values corresponding to the points α, β, γ at points $a_l$, $b_l$, $c_l$ at which light paths that include line segments α-$e_l$, β-$e_l$, γ-$e_l$ intersect the display plane of the display apparatus 12.

Since the function y=f(x, e) for obtaining the coordinate y of point y at which a light path that includes a line segment that connects point x from coordinate vector x of point x in a three-dimensional space with an eye position e (coordinate vector e=$e_r$, $e_l$) intersects the display plane of the display apparatus 12 is generally non-linear, it has been difficult to execute in real time. However, an appropriate selection of optical system parameters enables function f to be approximated by using a linear function combined with an orthogonal projection, making it possible to readily accomplish the drawing in real-time, using computers that are currently available.

In size, the display apparatus 12 shown in FIG. 1 is a 3:4 (length:width) rectangle measuring approximately 175 cm diagonally. The display apparatus 12 is a screen onto which images 10 and 11 are projected by two projectors (not shown) behind the screen. Therefore, the display apparatus 12 presents two images 10 and 11 having different parallax, The two types of images can be separated, so for use they can therefore be given polarizations that are mutually orthogonal. For example, the first image 10 could be used with a vertical or clockwise circular polarization and the second image 11 with a horizontal or counterclockwise circular polarization. The image-separation apparatuses 7 and 8 and image formation system 6 are positioned between the display apparatus 12 and the viewer 3. Light from the display apparatus 12 is sent to the image formation system 6 via the image-separation apparatus moving mechanism 9, while other light is blocked. The distance between the display apparatus 12 and the image-separation apparatus moving mechanism 9 is variable within the range 35 to 75 cm, and the distance between the image-separation apparatus moving mechanism 9 and the image formation system 6 is variable within the range 45 to 85 cm, As one example, the image formation system 6 uses a pair of 90-cm-diameter Fresnel lenses arranged with the flat sides facing each other, and has a focal distance of about 76 cm. The use of Fresnel lenses is not limitative, and normal spherical or aspherical lenses can be used. The distance between the image formation system 6 and the viewer 3 is variable within the range of 80 to 140 cm. In this optical system, the path of the first image light that impinges on the left eye 5 of the viewer 3 uses light that is focused substantially to a point between the display apparatus 12 and the image formation system 6 at which is located the image-separation apparatus 7 constituted by a polarizing plate that transmits light having the same polarization as the light of the first image 10. The path of the image light that impinges on the right eye 4 of the viewer 3 uses light that is focused substantially to a point between the display apparatus 12 and the image formation system 6 at which is located the image-separation apparatus 8 constituted by a polarizing plate that transmits light having the same polarization as the light of the second image 11. The polarizing plates are each about 15 cm long and about 12 cm wide. These values have to be changed if the focal distance of the system 6 is changed.

Because the place at which the light path is focused varies depending on the position of the viewpoint of the viewer 3, the position and attitude of the head are tracked so that the positions of the image-separation apparatuses 7 and 8 correspond to the points at which light impinges on the left eye and light impinges on the right eye are gathered respectively. This is done by means of the image-separation apparatus moving mechanism 9. Movement can be effected by a known method using servo-motors and an XY recorder or the like. This ensures that the respective images are constantly projected onto the eyes of the viewer. The position of the viewer's viewpoint can be measured using a known method that uses an inclined magnetic field and a magnetic sensor 2. This method provides information on both position and orientation, and thus enables the positions of both eyes to be obtained. In the case of the above optical system the real images are formed between the lenses 6 and the viewer 3, as shown in FIG. 2. Thus, taking the real image plane 14 as the image presentation reference point, by imparting the correct parallax at that position, it becomes possible to produce the images in the space near the viewer in which discrepancies between the viewpoints and the focus of the eyes are reduced.

The above explanation has been made with reference to images 10 and 11 being projected by projectors with different polarization characteristics. However, if a CRT display is used for the display apparatus 12, the images can be presented by alternating the display of the images 10 and 11 at a frequency of 120 Hz, or 60 Hz each. In such a case, the image-separation apparatuses can use an optical shutter operated in synch with the images, enabling images displayed at 120 Hz to be alternated between the right and left eyes. The optical shutter may be configured as a liquid-crystal shutter with a polarization filter that controls the polarization characteristics.

A second embodiment of the stereoscopic image display apparatus of this invention will now be described with reference to FIG. 3. In the apparatus of FIG. 3, the image-separation apparatus of the first embodiment has been improved making it unnecessary to physically move it, with the image-separation apparatus 15 comprising a plurality of liquid-crystal shutter layers divided into multiple pixels. Other aspects of the configuration are more or less the same as the first embodiment. Size for both the first and second images is 105 cm high by 140 cm wide. The size of the liquid-crystal shutters is 60 cm high by 60 cm wide and each shutter (pixel) is 60 cm high by 1 cm wide. It is desirable to use around two to five shutter layers. The spacing between shutters is not fixed, but ranges from 4 to 12 cm. Factors relating to the number of layers used include loss of image quality and brightness through the shutters, and manufacturing costs. When the viewer 3 is farthest away as viewed from the image formation system 6, the shutter closest to the image formation system 6 is used. When the viewer 3 is closest as viewed from the image formation system 6, the shutter farthest from the image formation system 6 is used. By doing this on a pixel by pixel basis, images can be viewed stereoscopically without having to physically move the image-separation apparatus. For pixels that do not have to be used, the power to the shutters concerned can be switched off, allowing the passage of light. A video signal distribution and control computer is used to control the image-separation apparatus of this embodiment.

A third embodiment of the stereoscopic image display apparatus of the invention will now be described with reference to FIG. 4. In the apparatus of FIG. 4, the apparatus used to track the position of the viewpoints comprises a display apparatus that uses a pair of stereo cameras 16. A video signal distribution and control computer 1 is used to process the data from the cameras 16. Detection of viewpoint position is effected by a known method which uses image processing to extract the eyes 4 and 5 and estimates depth based on parallax between camera images. This configuration makes it unnecessary for the viewer 3 to wear a position detection apparatus.

Figure 5:
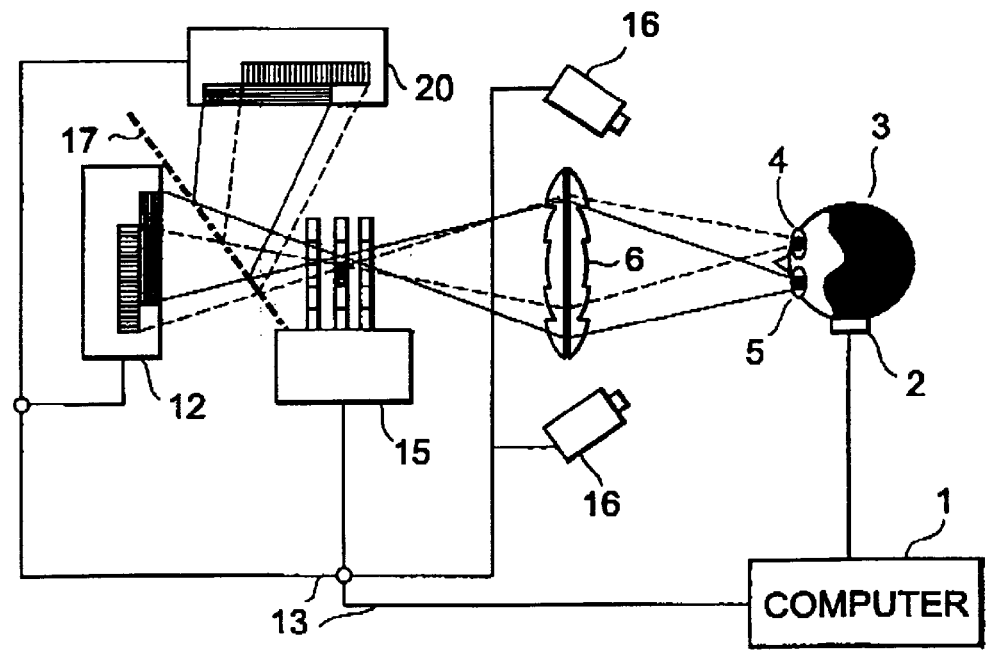
FIG. 5 is a schematic view showing the configuration of a stereoscopic image display apparatus according to a fourth embodiment of the invention.
Figure 6:
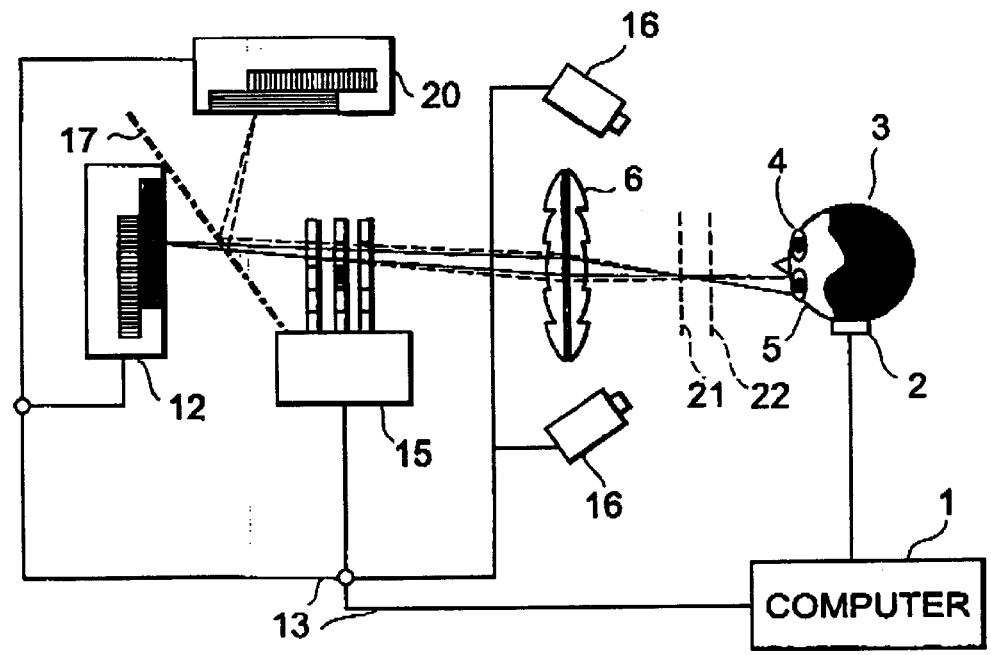
FIG. 6 is a schematic view showing two real image planes formed in the stereoscopic image display apparatus of FIG. 5.

A fourth embodiment of the stereoscopic image display apparatus of the invention will now be described with reference to FIG. 5. In order to further reduce discrepancies between binocular parallax and the focusing of the eyes, FIG. 5 shows a display apparatus that uses a half-mirror 17 to synthesize images from display apparatuses 12 and 20 having different depths. As shown in FIG. 6, the images thus synthesized are displayed on real image planes 21 and 22 using depthwise parallax. In this case, image perspective information is used to display relatively distant images on a relatively more distant real image plane, making them seem relatively further away from the perspective of the viewer 3. Also, middle-distance images are displayed by the display apparatuses 12 and 20 by using pixel brightness levels that are proportional to the distance. As a result, at distances close to the eye, the viewer can be presented with focusing information used by the eye to give a sense of depth. Synthesis of images having different depths can also be accomplished by using a see-through type display.

Figure 7:
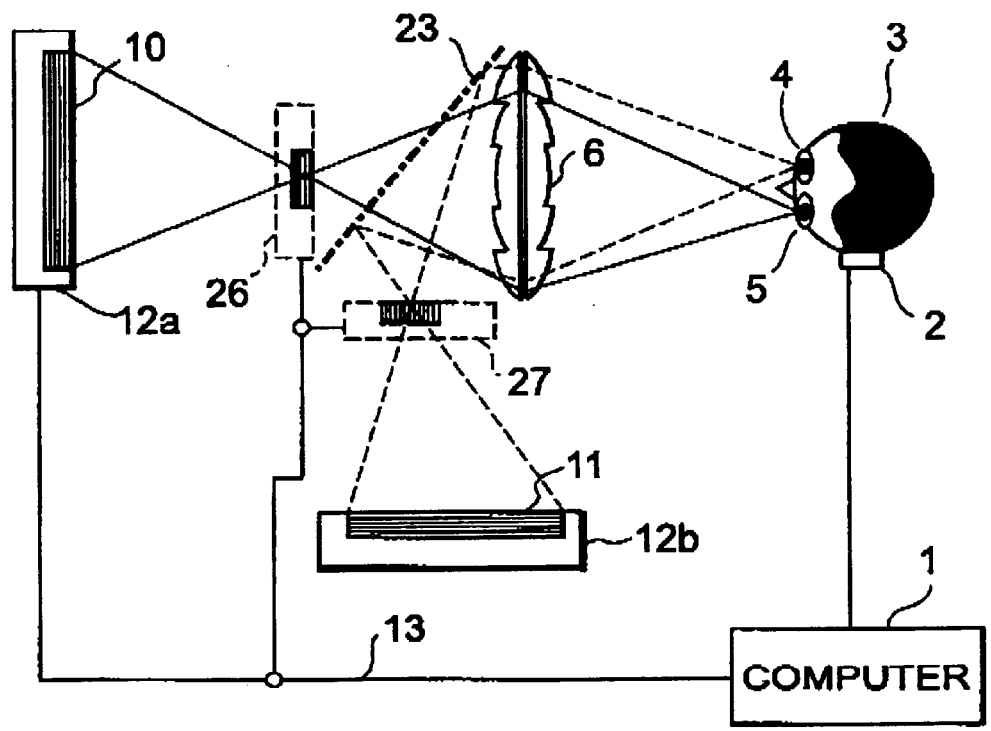
FIG. 7 is a schematic view showing the configuration of a stereoscopic image display apparatus according to a fifth embodiment of the invention.

A fifth embodiment of the stereoscopic image display apparatus of the invention will now be described with reference to FIG. 7, which shows a variation on the second embodiment. First and second images 10 and 11 are independently displayed by display apparatuses 12a and 12b which are oriented at right-angles to each other. A half-mirror 23 is used to synthesize the first and second images 10 and 11. Image-separation apparatuses 26 and 27 are comprised of liquid-crystal shutters for each of the images. Transmission type liquid-crystal is used for the liquid-crystal shutters, which are disposed at right-angles, as shown in FIG. 7. This image display apparatus requires no special components. Although it only employs components in widespread general use, as shown, these can be used to manufacture an apparatus that can display stereoscopic images.

Figure 8:
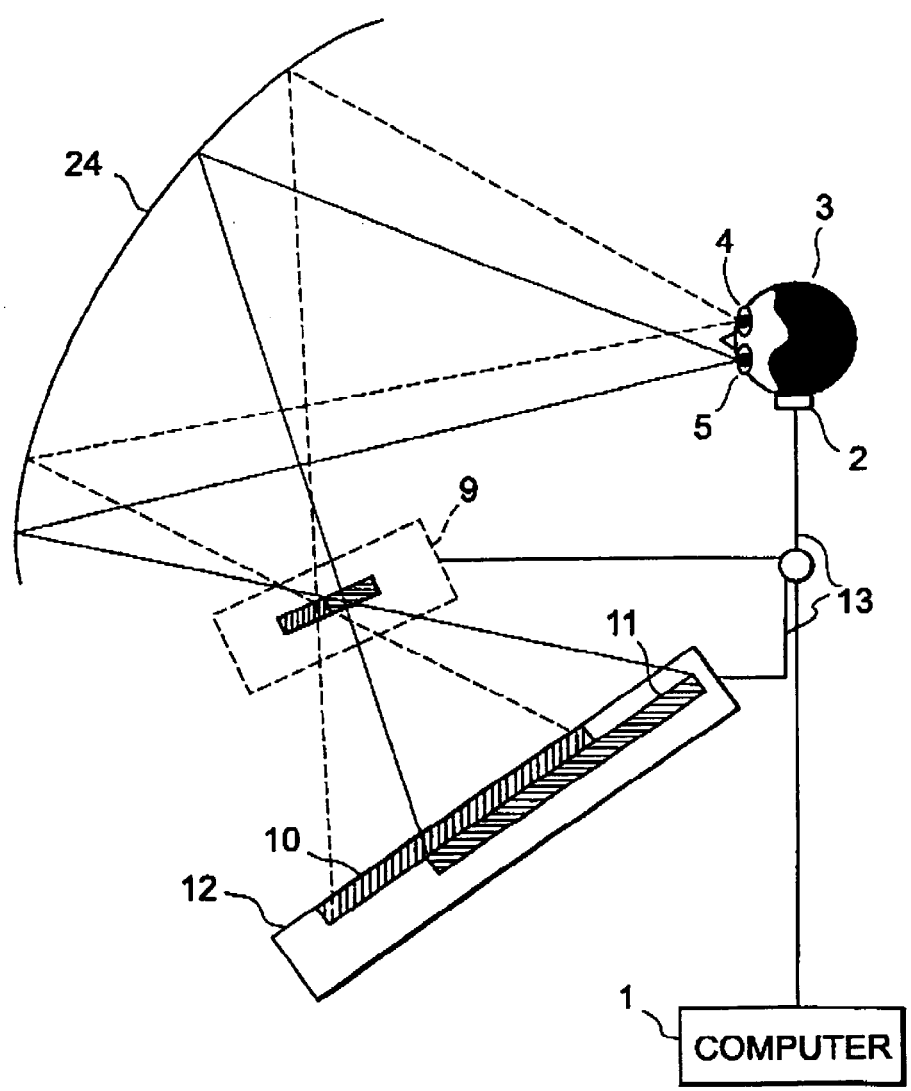
FIG. 8 is a schematic view showing the configuration of a stereoscopic image display apparatus according to a sixth embodiment of the invention.

A sixth embodiment of the stereoscopic image display apparatus of the invention will now be described with reference to FIG. 8. Instead of the Fresnel lens image formation system of the first embodiment, this apparatus uses a concave mirror 24 approximately 100 cm in diameter. The spacing between the mirror 24 and the viewer 3 is from 80 to 120 cm. This embodiment is characterized in that the image formation system used to display the stereoscopic images does not occupy much depth, and it does not give rise to chromatic aberration.

Figure 10:
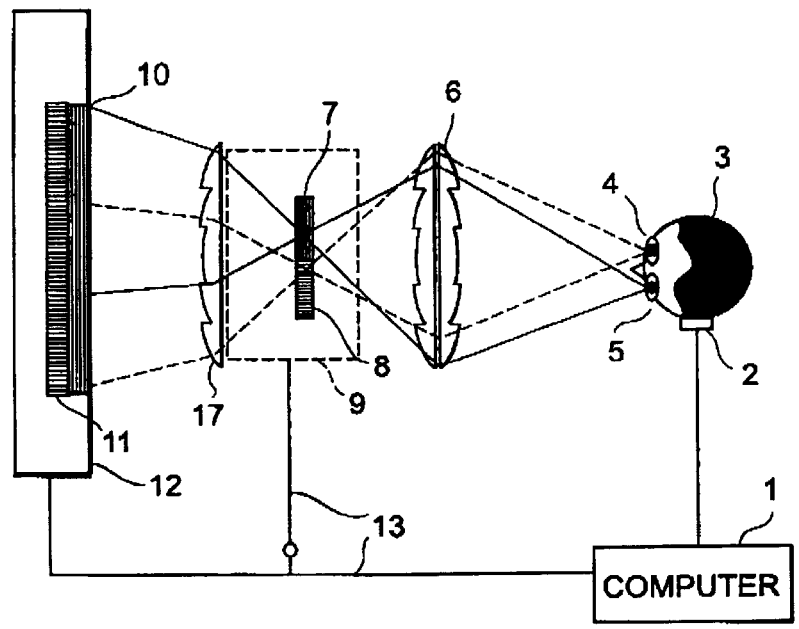
FIG. 10 is a schematic view showing the configuration of a stereoscopic image display apparatus according to a seventh embodiment of the invention.
Figure 13:
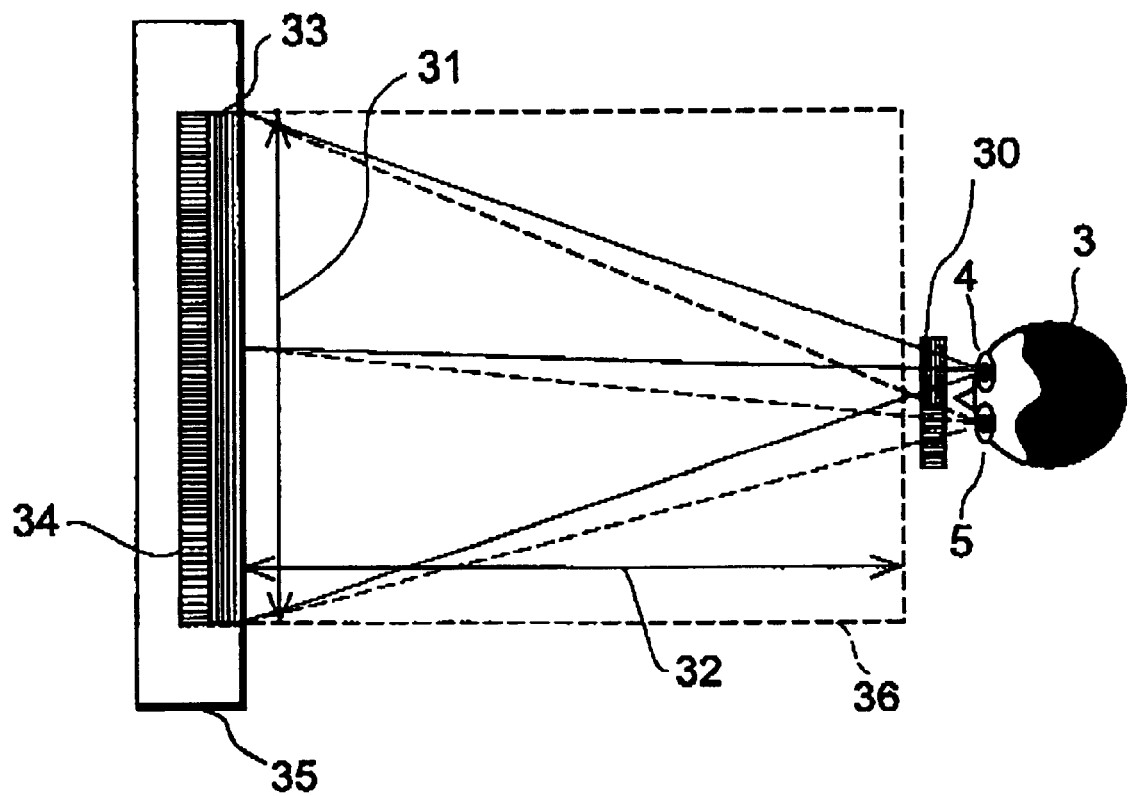
FIG. 13 is a schematic view of a prior art stereoscopic image display apparatus that uses stereoscopic glasses.

In the stereoscopic image display apparatuses of the embodiments described in the foregoing, the display screen has to be large enough to accommodate the range of movement of the viewer. In this regard, FIG. 10 shows a stereoscopic image display apparatus according to a seventh embodiment in which a light converging system 17 is located between the image-separation apparatus moving mechanism 9 and the display apparatus 12, enabling the size display apparatus 12 to be kept down. With reference to FIG. 12, an image distribution and control computer is used to effect control whereby an arbitrary point on a displayed three-dimensional image is drawn at a point at which a light path that includes a line segment connecting said point on the three-dimensional image with the viewer's left or right eyeball intersects the display plane of the display apparatus.

Below, the seventh embodiment is explained with reference to FIG. 11. FIG. 11(a) is a front view of a transportable image display apparatus, and FIG. 11(b) is a side cross-sectional view of the apparatus. Light from the display apparatus 12 that displays the first and second images alternately, reaches the real image plane 14 via a liquid-crystal π cell 15, a Fresnel lens forming first light converging system 17, an image-separation apparatus 9 provided on an XY table that can be adjusted to match the position of the viewer 3, a reflector 16, and an image formation system 6 formed by a pair of Fresnel lenses.

The display apparatus 12 in FIG. 11 is a CRT display in the shape of a rectangle with a height-to-width ratio of 3:4 and a diagonal size of about 50 cm. The image display apparatus 12 displays two types of images, which are separated for the right and left eyes by a polarizing screen. For example, vertical polarization is used for the first image, and horizontal polarization for the second. The same display apparatus is used to display images for both the left and right eyes, with the images being displayed alternately at a frequency of 120 Hz, or 60 Hz each. The liquid-crystal π cell 15 operates in synch with the images displayed by the display apparatus 12.

The light converging system 17 is used to effectively increase the size of the display screen, enhancing the degree of freedom with respect to the position of the viewer. The light converging system 17 is a Fresnel lens 55 cm high by 65 cm wide, with a focal distance of 80 cm. The image-separation apparatus 9 comprises a polarizing filter that transmits just one of the two types of polarization characteristic, and a polarizing filter that transmits just the other type. The image-separation apparatus moving mechanism 9 is located on the light path between the display apparatus and the viewer, where the light path comes to a focus. The position of the image-separation apparatus moving mechanism 9 has to be controlled according to the viewpoint position of the viewer. This is done by tracking the position and attitude of the viewer's head and adjusting the position of the image-separation apparatus moving mechanism 9 to the point at which light that impinges on the eyes is gathered. This tracking can be done by a known method using servo-motors and an XY recorder or the like. This tracking mechanism ensures that the respective images are constantly projected onto the eyes of the viewer. A liquid-crystal shutter apparatus having two to five layers divided into multiple pixels can be used in place of this image-separation apparatus, in which case there would be no need for a physical drive. The second reflector 16 is for changing the light path, to reduce the depth of the apparatus.

The image formation system 6, which is used to form real images in front of the viewer, comprises a pair of Fresnel lenses arranged with the flat sides facing each other. The system 6 is 55 cm high by 65 cm wide, and has a focal distance of 80 cm. The system is not limited to Fresnel lenses, and can instead be constituted using ordinary spherical or aspherical lenses. The distance between the image formation system 6 and the viewer 3 can be varied from 70 to 130 cm.

The position of the viewer's viewpoint can be measured in accordance with a known method that uses an inclined magnetic field and a magnetic sensor 2. This method provides information on both position and orientation, and thus enables the position of both eyes to be obtained. The images displayed on the display apparatus 12 are images obtained when the position of each eye in three-dimensional space is observed, based on the information on the positions of both eyes of the viewer 3, with the images being generated by computation to be displayed on the real image plane. This computation can be specifically implemented as follows. All of the pixels x∈X included in a set X of pixels of a three-dimensional image to be presented to the right eye 4 on the display apparatus 12 are drawn at a brightness value corresponding to pixel x at points at which light paths that include line segments $x\text{-}e_r$ connecting x and a three-dimensional position $e_r$ of the right eye intersect a display plane of the display apparatus 12. Similarly, all of the pixels x∈X included in a set X of pixels of a three-dimensional image to be presented to the left eye 5 on the display apparatus 12 are drawn at a brightness value corresponding to pixel x at points at which light paths that include line segments $x\text{-}e_l$ connecting x and a three-dimensional position $e_l$ of the left eye intersect the display plane of the display apparatus 12. The light path can be calculated by a known method using trigonometric functions based on lens curvature and refractive index.

To explain a specific example with respect to FIG. 12, if three points α, β, and γ are to be drawn in three-dimensional space, images for the right eye are drawn at brightness values corresponding to the points α, β, γ at points $a_r$, $b_r$, $c_r$ at which light paths that include line segments $\alpha\text{-}e_r$, $\beta\text{-}e_r$, $\gamma\text{-}e_r$ intersect the display plane of the display apparatus 12, and images for the left eye are drawn at brightness values corresponding to the points α, β, γ at points $a_l$, $b_l$, $c_l$ at which light paths that include line segments $\alpha\text{-}e_l$, $\beta\text{-}e_l$, $\gamma\text{-}e_l$ intersect the display plane of the display apparatus 12.

Since the function $y=f(x, e)$ for obtaining the coordinate y of point y at which light paths that include a line segment that connects point x from coordinate vector x of point x in three-dimensional space with eye position e (coordinate vector $e=e_r$, $e_l$) intersect the display plane of the display apparatus 12 is generally non-linear, it has been difficult to execute in real time. However, an appropriate selection of optical system parameters enables function f to be approximated by using a linear function combined with an orthogonal projection, making it possible to readily accomplish the drawing in real-time, using computers currently on the market.

In accordance with the present invention, as can be understood from the foregoing explanation, based on the detected three-dimensional positions $e_r$, $e_l$ of the viewer's eyes, with respect to all of the pixels x∈X included in a set X of pixels of a three-dimensional image to be displayed, images presented to the viewer's right eye are drawn at points at which light paths that include line segments $x\text{-}e_r$ connecting x and a three-dimensional position $e_r$ of the right eye intersect the display plane of the display apparatus, and images presented to the viewer's left eye are drawn at points at which light paths that include line segments x-$e_l$ connecting x and a three-dimensional position $e_l$ of the left eye intersect the display plane of the display apparatus. As a result, it is possible to present a stereoscopic image in front of the viewer, who perceives it as having depth, without needing a mechanism for processing large amounts of image data, without any need for complex devices and without the viewer having to wear a stereoscopic viewing apparatus. Moreover, even if the viewer moves, the ability to select light paths linked to movement in the position of the viewer's eyeballs means that the viewer can still see the stereoscopic images. The invention uses a light focusing system between the display apparatus and the image-separation apparatus, making it possible to reduce the size and weight of the apparatus and to increase the size of the display screen, increasing the extent by which a viewer can move.

What is claimed is:

1. A stereoscopic image display apparatus comprising:
    at least one display apparatus that displays first and second images having parallax;
    an image-separation apparatus that separates the first and second images from the display apparatus;
    an image formation system that forms the first and second images thus separated on respective eyes; and
    a position detection unit able to acquire information on positions of eyeballs of a viewer,
    wherein said image-separation apparatus is arranged between the display apparatus and the image formation system on a light path on which light information emitted by the display apparatus reaches the viewer,
    said image formation system is positioned between the image-separation apparatus and the viewer,
    real images of the display apparatus are formed in air, between the image formation system and the viewer, and
    display content of the first image and display content of the second image are changed in accordance with the information on the positions of the viewer's eyeballs.

2. A stereoscopic image display apparatus according to claim 1, wherein said at least one display apparatus has a configuration comprising:
    a first projector configured to display an image having first characteristics; and
    a second projector configured to display an image having second characteristics that differ from those of the first image.

3. A stereoscopic image display apparatus according to claim 2, wherein said image having the first characteristics is an image that uses vertically or clockwise circularly polarized light and said image having the second characteristics is an image that uses horizontally or counterclockwise circularly polarized light.

4. A stereoscopic image display apparatus according to claim 1, wherein said at least one display apparatus is a display apparatus that alternately displays first images at a first display frequency and second images at a second display frequency that is substantially the same as the first display frequency.

5. A stereoscopic image display apparatus according to claim 1, wherein said image-separation apparatus also performs light path selection linked to viewer eyeball movement.

6. A stereoscopic image display apparatus according to claim 1, further comprising:
    a plurality of display apparatuses and a plurality of real image planes formed by real images of the display apparatuses formed between the image formation system and the viewer;
    means for selecting one or a combination of display apparatuses from among the plurality of display apparatuses in accordance with image perspective information; and
    means for displaying images on the selected one or combination of the display apparatuses.

7. A stereoscopic image display apparatus according to claim 1, further comprising a light converging system disposed between said at least one display apparatus and said image-separation apparatus.

8. A stereoscopic image display method comprising:
    displaying on a display apparatus a first or second image corrected according to positional coordinates of a viewer's right or left eye;
    transmitting light signals emitted by the display apparatus through an image-separation apparatus that separates the first and second images;
    guiding the transmitted light signals to an image formation system wherein said image formation system is positioned between the image-separation apparatus and the viewer;
    forming real images of the display apparatus in air, between the image formation apparatus and the viewer; and
    presenting the formed images to the viewer.

9. A stereoscopic image display method according to claim 8, further comprising modifying images on the display apparatus in accordance with movement in a viewer eye position, so that with respect to all pixels xeX included in a set X of pixels of a three-dimensional image to be displayed, images presented to a viewer's right eye are drawn at points at which light paths that include line segments x-$e_r$ connecting x and a three-dimensional position $e_r$ of the right eye intersect a display plane of the display apparatus, and images presented to a viewer's left eye are drawn at points at which light paths that include line segments x-$e_l$ connecting x and a three-dimensional position $e_l$ of the left eye intersect the display plane of the display apparatus.

10. A stereoscopic image display method according to claim 8, further comprising transmitting light signals produced by the display apparatus through the image-separation apparatus via a light converging system.

* * * * *